Aug. 3, 1926.
E. W. ROBEY
REMOVAL OF ASHES AND THE LIKE FROM FURNACES
Filed May 12, 1924     2 Sheets-Sheet 1
1,594,381
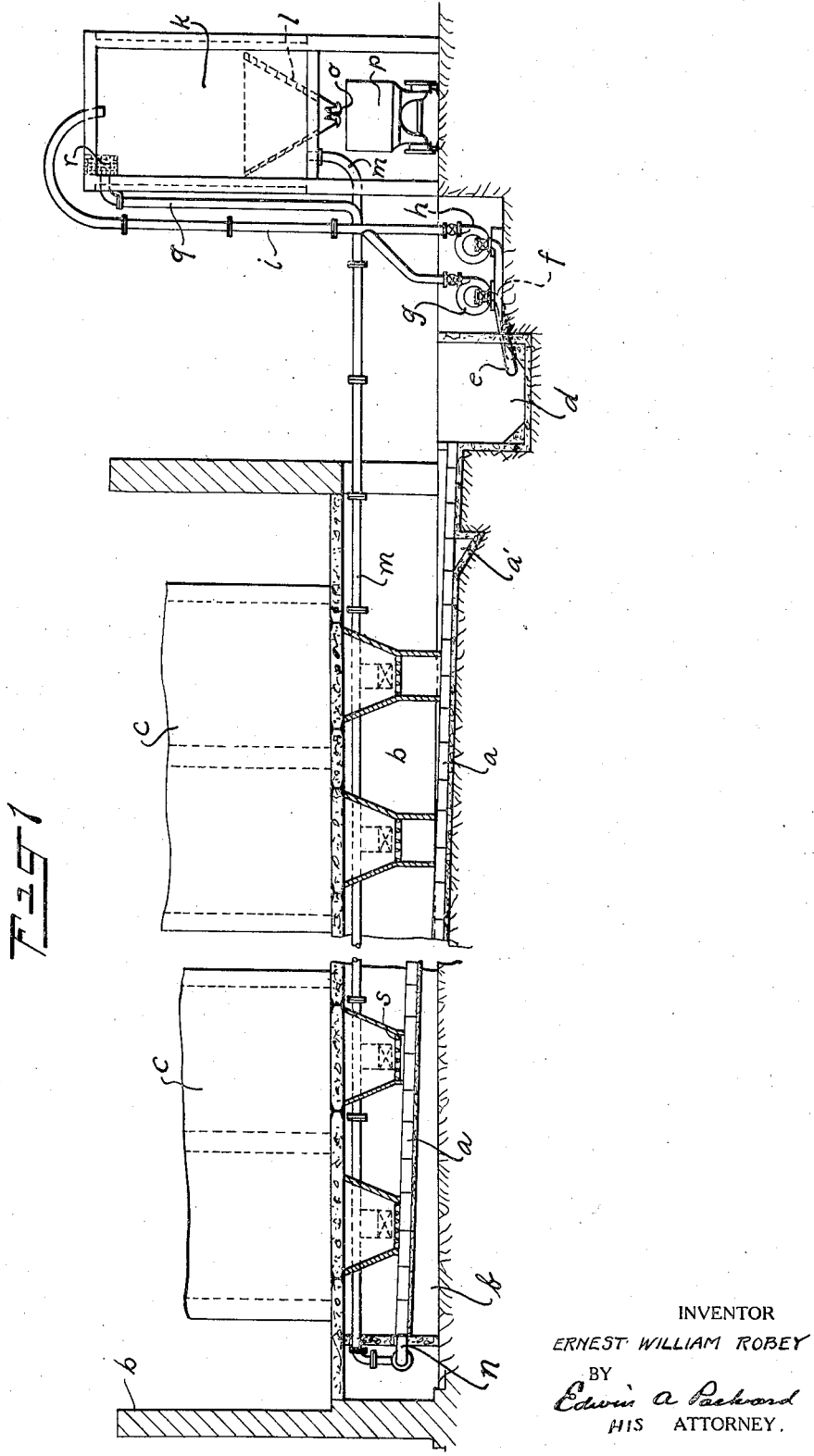
INVENTOR
ERNEST WILLIAM ROBEY
BY
Edwin A. Packard
HIS ATTORNEY.

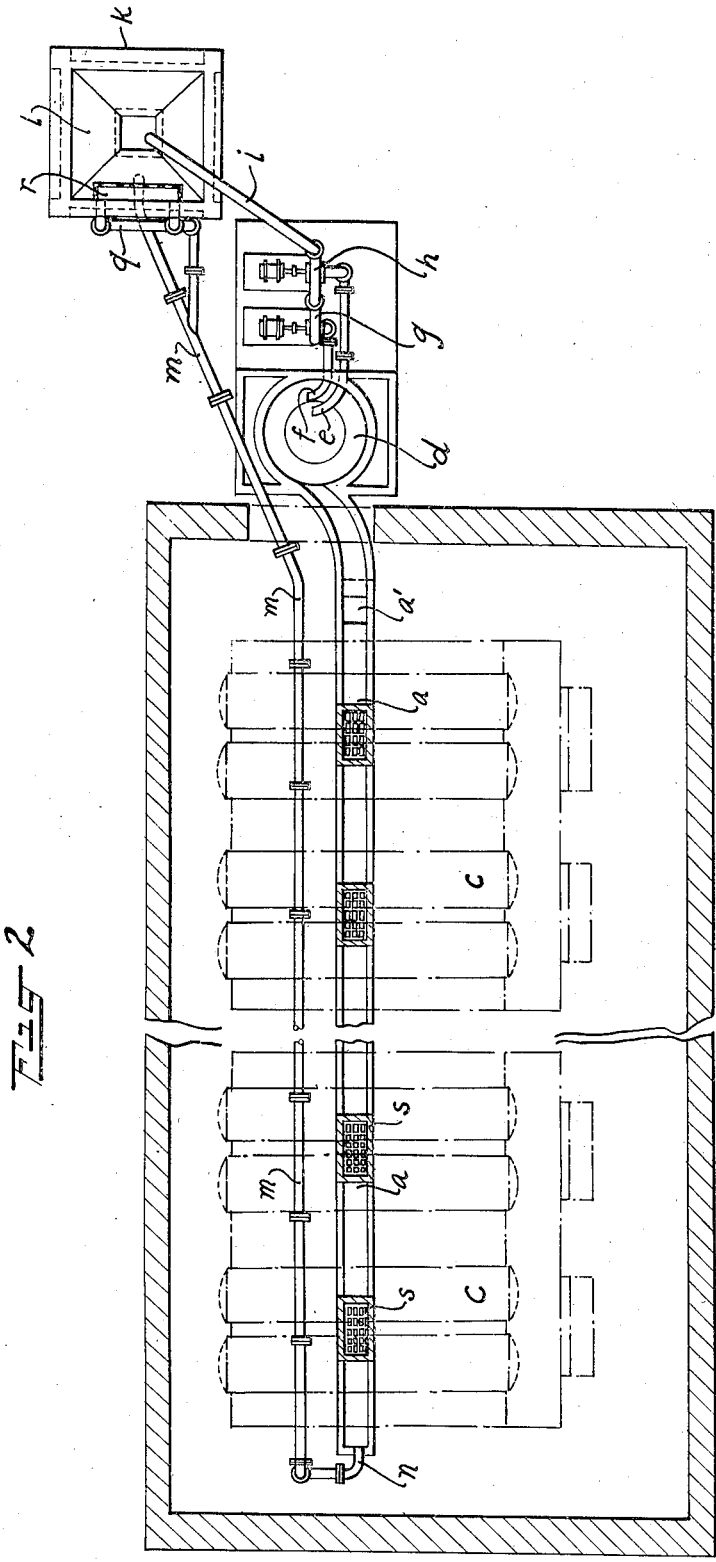

Patented Aug. 3, 1926.

1,594,381

UNITED STATES PATENT OFFICE.

ERNEST WILLIAM ROBEY, OF LONDON, ENGLAND, ASSIGNOR TO INTERNATIONAL COMBUSTION ENGINEERING CORPORATION, A CORPORATION OF DELAWARE.

REMOVAL OF ASHES AND THE LIKE FROM FURNACES.

Application filed May 12, 1924, Serial No. 712,523, and in France and Germany April 19, 1924.

The system of removing ashes and the like in which a current of water flowing down a trough washes into a sump the ashes received by the trough from the furnaces, the water being returned by a pump to the head of the trough, as described, for example, in U. S. Letters Patent to Wilfred R. Wood and myself, No. 1,440,757, dated January 2, 1923, necessitates some form of conveyer for removing the ashes from the sump.

According to this invention the ashes and water are elevated together from the sump into a screening device above the point at which they are to be delivered, the ashes into a suitable receptacle and the water to the upper end of the trough.

Thus the ashes and water may be drawn from the sump by a pump which delivers them into a screen placed at a suitable level higher than the upper end of the trough. The ashes are delivered from the screen into a bunker, wagon, barge or other receptacle and the water which runs through the screen is collected and conducted by a pipe or channel to the upper end of the trough.

In the accompanying drawings Figure 1 is a sectional elevation and Figure 2 a plan of an installation constructed in accordance with the invention.

The trough $a$ extending along the boiler house $b$ collects the ashes from the furnaces $c$ in the manner described in the aforesaid Letters Patent. It is preferably provided with a catch pit $a'$ adapted to collect metal parts or pieces liable to injure the pumps which are to lift the ashes. Further, for ensuring that the ashes may be dealt with by the pumps without injury to the latter, the ash discharge chute from each furnace may have a coarse screen or breakers, whereby pieces larger than the size conveniently handled by the pump may be removed or broken up. A flow of water down the trough washes the ashes into the cylindrical sump $d$, delivering them tangentially as indicated in Figure 2, so that the swirling motion thereby produced in the sump may prevent settlement and building up of the ashes. The suction pipes $e$ $f$ of the pumps $g$ $h$, respectively, face the direction of the swirling motion. One of the pumps or both of them lift the water and ashes up a delivery pipe $i$ whence they are discharged into an ash bunker $k$ constituting part of an ash receiving and screening device which may be multiplied or subdivided into compartments so that while one bunker or compartment is being filled another may be discharging or draining. The bunker contains a false bottom $l$ composed of grids—collectively, in effect, constituting a screen—of such arrangement and mesh that the ashes are retained by them while the water drains from the retained ashes. The water passing through the grids, or screen formed thereby, flows from the bunker $k$ through pipe $m$ which conducts the water to and discharges it at $n$ into the head of the trough $a$.

When the bunker $k$ is full of ashes, or sooner, the doors $o$ which normally close it at bottom are opened to discharge the ashes into the truck $p$ or any other suitable receiving and removing device. Above the discharge opening there may be employed nozzles for supplying jets of steam or other convenient fluid under pressure to assist the discharge of ashes.

The coarser ashes accumulating in the ash bunker $k$ act as a filter for the finer ones which would otherwise pass through the grids or screen and remain in circulation, eventually choking the system. In performing this function the bunker is apt to become choked more or less with finer ones before it is full enough for discharge, in which case the water may not flow freely through it. To meet this contingency there is an overflow pipe $q$ leading from the bunker the entrance to which pipe $q$ is by passage through a screen $r$ which filters out the ashes. The overflow discharges into the main pipe $m$.

Having now particularly described and ascertained the nature of the said invention and in what manner the same is to be performed, what is claimed is:—

1. In an ash removal apparatus of the type having a trough into which the ashes are discharged, means for directing a stream of water into the trough to wash the ashes in one direction along the trough, a sump for receiving the ashes and water from the trough, a bunker, and controllable means for conveying the water and ashes from the sump and into said bunker, the improvement which comprises a screen located in the bunker and spaced a distance above the bottom thereof upon which the water and ashes are deposited, a drain pipe leading from said bunker at a point located beneath the screen, and a second drain pipe leading from the bunker at a point located a distance above said screen, both of said drain pipes being in communication with said means for directing the water into said trough.

2. In an ash removal apparatus of the type having a trough into which the ashes are discharged, means for directing a stream of water into the trough to wash the ashes in one direction along the trough, a sump for receiving the ashes and water from the trough, and a bunker for receiving the ashes and water from the sump, the improvement which comprises means for admitting the water and ashes tangentially into the sump, and means for drawing them off tangentially from the sump so as to tend to cause a swirling motion in one direction of the contents of the sump.

This specification signed the 24th day of April, 1924.

ERNEST WILLIAM ROBEY.